US007400508B2

(12) United States Patent
Erickson et al.

(10) Patent No.: US 7,400,508 B2
(45) Date of Patent: Jul. 15, 2008

(54) APPARATUS FOR SECURING A DEVICE WITHIN A CHASSIS

(75) Inventors: Vernon D. Erickson, Dakota Dunes, SD (US); David R. Davis, Jefferson, SD (US); Kevin A. Patin, El Paso, TX (US)

(73) Assignee: Gateway Inc., Irvine, CA (US)

( * ) Notice: Subject to any disclaimer, the term of this patent is extended or adjusted under 35 U.S.C. 154(b) by 31 days.

(21) Appl. No.: 10/373,120

(22) Filed: Feb. 24, 2003

(65) Prior Publication Data

US 2003/0129020 A1    Jul. 10, 2003

Related U.S. Application Data

(63) Continuation-in-part of application No. 09/636,013, filed on Aug. 10, 2000, now Pat. No. 6,582,150.

(51) Int. Cl.
*H05K 7/16* (2006.01)
(52) U.S. Cl. ............... 361/726; 361/385; 361/727; 403/322.4; 403/322.1; 403/330
(58) Field of Classification Search ............... 361/683, 361/685, 724–727; 174/50, 50.51, 50.54, 174/52.1; 403/321, 322.1, 322.4, 326, 330, 403/373, 374.1, 374.2, 374.5
See application file for complete search history.

(56) References Cited

U.S. PATENT DOCUMENTS

| 5,680,293 | A | * | 10/1997 | McAnally et al. ............ 361/685 |
| 5,822,196 | A | * | 10/1998 | Hastings et al. ............. 361/801 |
| 5,826,922 | A | | 10/1998 | Wernig |
| 5,949,652 | A | * | 9/1999 | McAnally et al. ............ 361/726 |
| 6,040,980 | A | * | 3/2000 | Johnson ....................... 361/685 |
| 6,233,152 | B1 | | 5/2001 | Abbott et al. |
| 6,236,563 | B1 | * | 5/2001 | Buican et al. ................ 361/685 |
| 6,272,005 | B1 | | 8/2001 | Jensen et al. |
| 6,288,901 | B1 | | 9/2001 | Liu et al. |
| 6,337,793 | B1 | * | 1/2002 | Vier et al. .................... 361/683 |

* cited by examiner

*Primary Examiner*—Daniel P. Stodola
*Assistant Examiner*—Michael P. Ferguson
(74) *Attorney, Agent, or Firm*—Jeffrey A. Proehl; Woods Fuller Shultz & Smith (57) ABSTRACT

A device retention mechanism suitable for mounting a device in a chassis of an information handling system may include a chassis and a retention member. The chassis is suitable for receiving a device and has a first side and a second side, the first side being generally perpendicular to the second side. The retention member is configured as a cam assembly and is mounted to the first side of the chassis, thereby enabling the retention member to exert a force against a device to secure the device to the chassis.

24 Claims, 13 Drawing Sheets

APPARATUS FOR SECURING A DEVICE WITHIN A CHASSIS

CROSS REFERENCE TO RELATED APPLICATIONS

The present application is a continuation-in-part of U.S. patent application Ser. No. 09/636,013, filed Aug. 10, 2000 now U.S. Pat. No. 6,582,150, titled "Method and Apparatus for Removal and Assembly of a Device within a Chassis." U.S. patent application Ser. No. 09/636,013 is incorporated by reference herein in its entirety.

FIELD OF THE INVENTION

The present invention generally relates to the field of a chassis for an electronic device, and particularly to a method and apparatus for securing a device within a chassis.

BACKGROUND OF THE INVENTION

The manufacture and assembly of information handling systems has become increasingly more competitive. Manufacturers continually strive to improve the design and features of information handling systems yet still offer competitive prices. One such area of improvement is in the mounting of devices in an information handling system. An information handling system, such as a typical desktop system, tower, server, and the like, may include information handling system devices, such as power supplies, disk drives, compact disk read-only memories (CD-ROMs), digital video disc (DVD) players, floppy drives, and the like. These devices are typically added to increase the functionality of the information handling system as desired by a user. However, the installation of such devices in the information handling system may be very labor intensive.

For instance, the installation of a power supply in an information handling system may involve the use of screws, typically seven, to attach the power supply to the chassis. Usually, these screws are small making them difficult to manipulate and install. Additionally, because of their small size, the screws may be dropped by an assembler, possibly causing damage to the information handling system due to shorts, lodging in moving parts, and the like.

Further, the upgrade and repair of information handling system devices has become increasingly complicated. For example, a user may need to replace a power supply in the information handling system. However, the removal of an old power supply may require the user to remove a plurality of screws to release the old power supply and the installation of additional screws to install the new power supply. This may require a significant amount of time, as well as result in a loss of components, such as the screws and other attaching hardware.

Further, other mounting systems configured for improved installation are typically not suitable for installation of heavy devices, such as power supplies. For example, a mounting system configured for the retention of a hard disk drive may not be able to support a heavier device, such as a power supply. Thus, a device retention mechanism is not available that is suitable for mounting heavy devices in an improved manner over traditional mounting methods utilizing screws.

Additionally, the installation of a power supply in an information handling system, whether by screws, nuts, rivets or otherwise, generally requires the use of tools to perform the installation. Furthermore, tools of general applicability, such as a screwdriver of standard size, may not be of such dimensions as to allow ease of installation, and so specialized tools may be required for installation of the power supply. It would be desirable that an improved device retention method be tool-less.

Therefore, it would be desirable to provide an improved device retention apparatus.

SUMMARY OF THE INVENTION

Accordingly, the present invention is directed to a method and apparatus of mounting a device in an information handling system. In an aspect of the present invention, a device retention mechanism suitable for mounting a device in a chassis includes a chassis and a retention member. The chassis is suitable for receiving a device and has a first side and a second side, the first side being generally perpendicular to the second side. The retention member is configured as a cam assembly and is mounted to the first side of the chassis, thereby enabling the retention member to exert a force against a device to secure the device to the housing.

In an additional aspect of the present invention, device retention mechanism suitable for mounting a device in an information handling system chassis includes an electronic device, a chassis and a retention member. The chassis is suitable for receiving the device and has a first side and a second side. The first side is positioned generally perpendicular to the second side. The retention member is mounted to the first side of the chassis, and is mounted in such a manner as to enable rotational movement generally parallel to the first side of the chassis. The retention member is mounted to the chassis to enable the retention member to contact the device, thereby securing the device to the chassis.

In a further aspect of the present invention, a device retention mechanism suitable for mounting a device in an information handling system chassis includes an electronic device including a retainer having at least one engaging member. A chassis is also included which is suitable for receiving the device. The chassis has a first side and a second side, the first side positioned generally perpendicular to the second side. The first side includes a receptacle sized to receive the at least one engaging member of the electronic device. A retention member configured as a cam assembly is mounted to the first side of the chassis. When the electronic device is positioned so that the engaging member is disposed within the receptacle of the chassis, the retention member is rotated to contact the device, thereby securing the engaging member within the receptacle.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 18, exemplary embodiments of the present invention are shown. There are a variety of devices that may be added to a chassis, such as a case of an information handling system, to increase functionality. To install and remove these devices, such as power supplies, compact disc read-only memories (CD-ROM), digital versatile disc (DVD), disk drives such as a hard disk, floppy disk, floppy/optical disk, and the like, typically required a time consuming effort to install and replace. For example, one complication of the installation process involves the use of small screws used to secure the device to the chassis, which may require the use of tools by an assembler to install the device in the chassis. Accordingly, the present invention provides a method and apparatus for the installation and removal of devices in a chassis in an efficient manner. For example, the present invention may provide an improved device retention mechanism for the installation of a device without requiring the use of tools, and further that embodiments of the present invention allow a user to actuate the mechanism for retaining the device with one finger.

Figure 1:
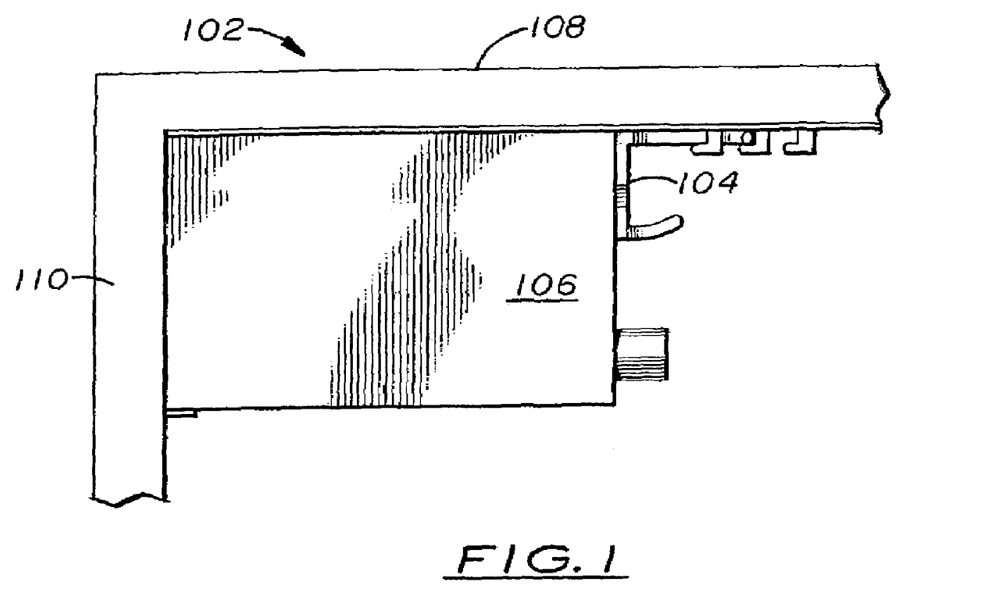
FIG. 1 is an illustration of an exemplary embodiment of the present invention wherein a device is secured to a chassis utilizing a retention member mounted to the chassis.

Referring now to FIG. 1, an illustration of an exemplary embodiment 100 of the present invention is shown wherein a device is secured to a chassis utilizing a retention member mounted to the chassis. A chassis 102 includes a retention member 104 for securing a device 106 to the chassis 102. The retention member 104 may be formed from plastic, composite, metal and the like without departing from the spirit and scope of the present invention. The chassis 102 includes a first side 108 and a second side 110. The first side 108 may be oriented generally perpendicular to the second side 110. The retention member 104 is mounted to the first side 108 of the chassis 102. Preferably, the retention member 104 is mounted to the chassis 102 to enable the retention member 104 to exert a force against the device 106. Thus, the device 106 is clamped between the retention member 104 and the second side 110 of the chassis 102. For example, the force exerted by the retention member 104 against the device 106 may force the device 106 against the second side 110 of the chassis 102, thereby securing the device 106 to the chassis 102.

Figure 2:
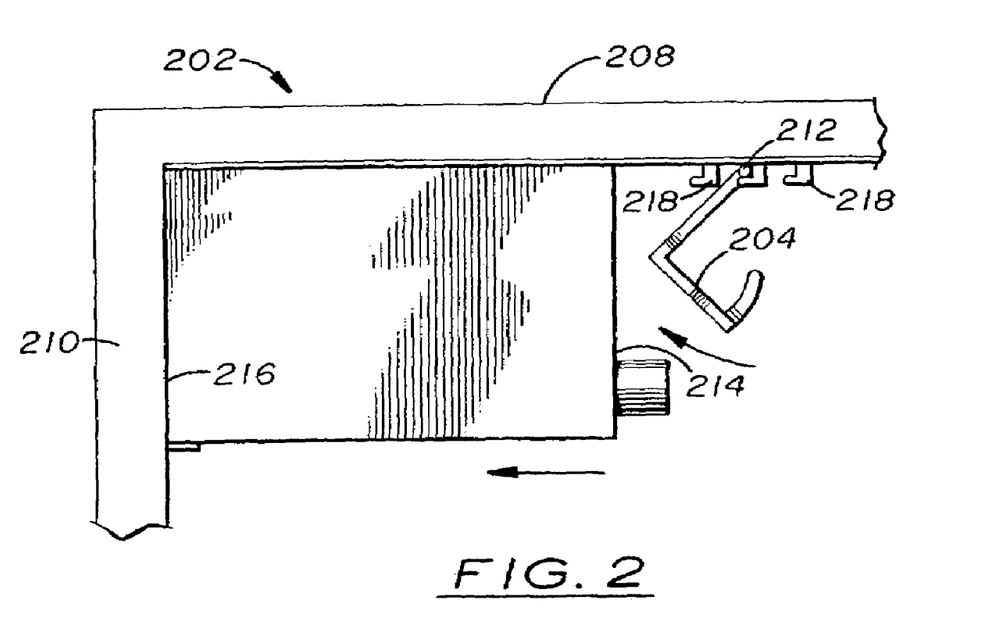
FIG. 2 is an illustration of a side view of an exemplary embodiment of the present invention wherein a chassis includes a retention mechanism for applying a force to a device to retain the device in the chassis.

For example, as shown in FIG. 2, in an exemplary embodiment of the present invention 200, a chassis includes a retention mechanism for applying a force to a device to retain the device in the chassis. A chassis 202 includes a retention member 204 for securing a device 206 to the chassis 202. The chassis 102 may include a first side 208 oriented generally perpendicular to the second side 210. Additionally, the retention member 204 may be formed so as to correspond to the junction between the device 206 and the chassis 202. For example, the retention member 204 may include a first retention side and a second retention side oriented generally perpendicular to each other. The retention member 204 is pivotally mounted 212 to the first side 208 of the chassis 202. Thus, as the retention member 204 pivots about the pivot point 212, the retention member 204 applies a force against a first side 214 of the device 206. This force causes the second side 216 of the device 206 to contact the second side 210 of the chassis 202, securing the device 206 to the chassis 202.

Further, it may be desirable to enable the retention member to be mounted at a plurality of positions for mounting a variety of standardized devices. For example, the retention member 204 may be mounted at a standardized distance from the second side 216 of the chassis to accept an ATX power supply. Additional mounts 218 may be provided at varying distances for accepting other devices, such as hard drives, CD-ROMs, floppy drives, and the like so as to increase the flexibility of the present invention. Further, it may be desirable to form the mounts 218 while "stamping" the first portion 208 of the chassis 202 to further improve manufacture efficiency the present invention.

Figure 3:
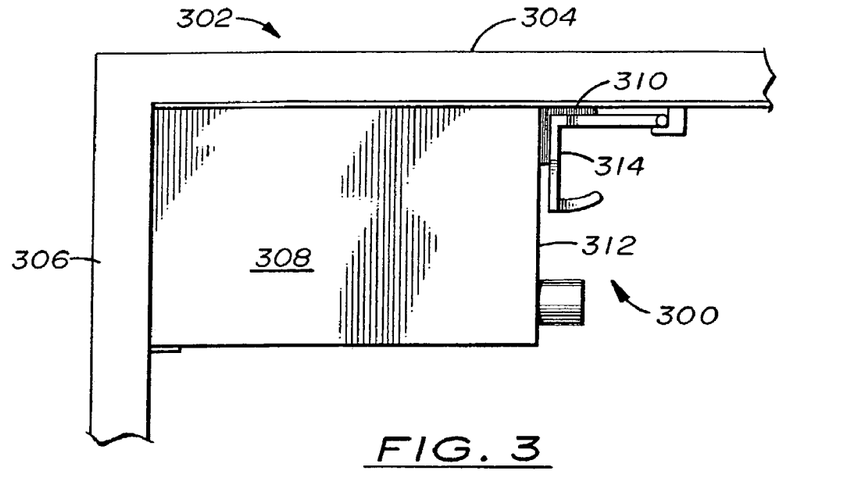
FIG. 3 is an illustration of an exemplary embodiment of the present invention wherein a retention member engages a retainer included on a device, the retainer suitable for securing the device to a chassis.
Figure 4:
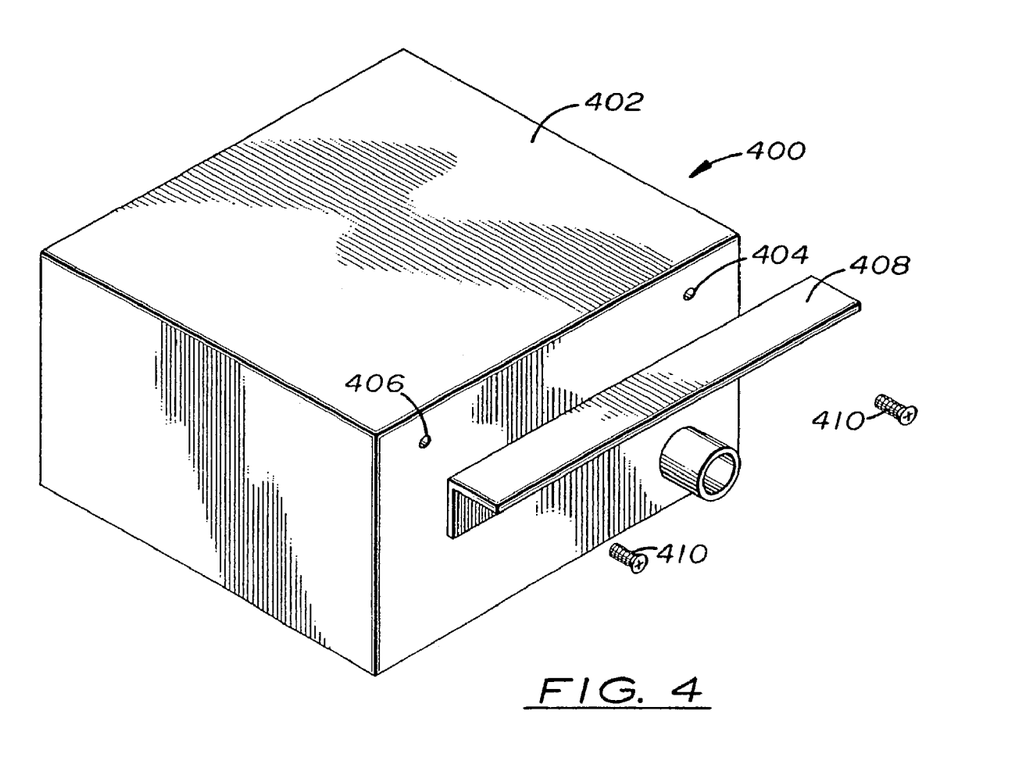
FIG. 4 is an isometric drawing of an exemplary embodiment of the present invention wherein a retainer is formed for mounting on standardized devices.

Referring now to FIG. 3, an exemplary embodiment 300 of the present invention is shown wherein a retention member engages a retainer included on a device for securing the device to a chassis 302. The chassis 302 includes a first side 304 and a second side 306. A device 308 includes a retainer 310 for providing additional securing to the device 308. For example, the retainer 310 may be mounted to the first side 312 of a device 308 to help further prevent the device 308 from slipping past the retention member 314 due to jarring of the chassis 302. Thus, the device 308 is securing in an improved manner.

The retainer may be configured for mounting on standardized devices. For example, as shown in an exemplary embodiment 400 in FIG. 4, an ATX power supply 402 includes two screw holes 404 and 406 for traditional mounting in a chassis 302 (FIG. 3). However, these screw holes 404 and 406 may also be utilized to mount a retainer 408 with screws 410 so as to provide increased holding ability. Thus, the present invention may be utilized without extensive modifications to the device, in this instance a power supply 402. Thus, the present invention may offer improved installation and removal even on heavy devices, such as power supplies. For example, previous mounting methods, while suitable for devices that are typically lighter, such as hard disk drives and the like, were unsuitable for use with a heavier device, such as a power supply. Thus, power supplies still had to utilize traditional mounting methods using screws. However, the present invention provides an improved mounting and removal method and apparatus that is suitable for use on heavier devices, such as power supplies, without the use of screws.

Figure 5:
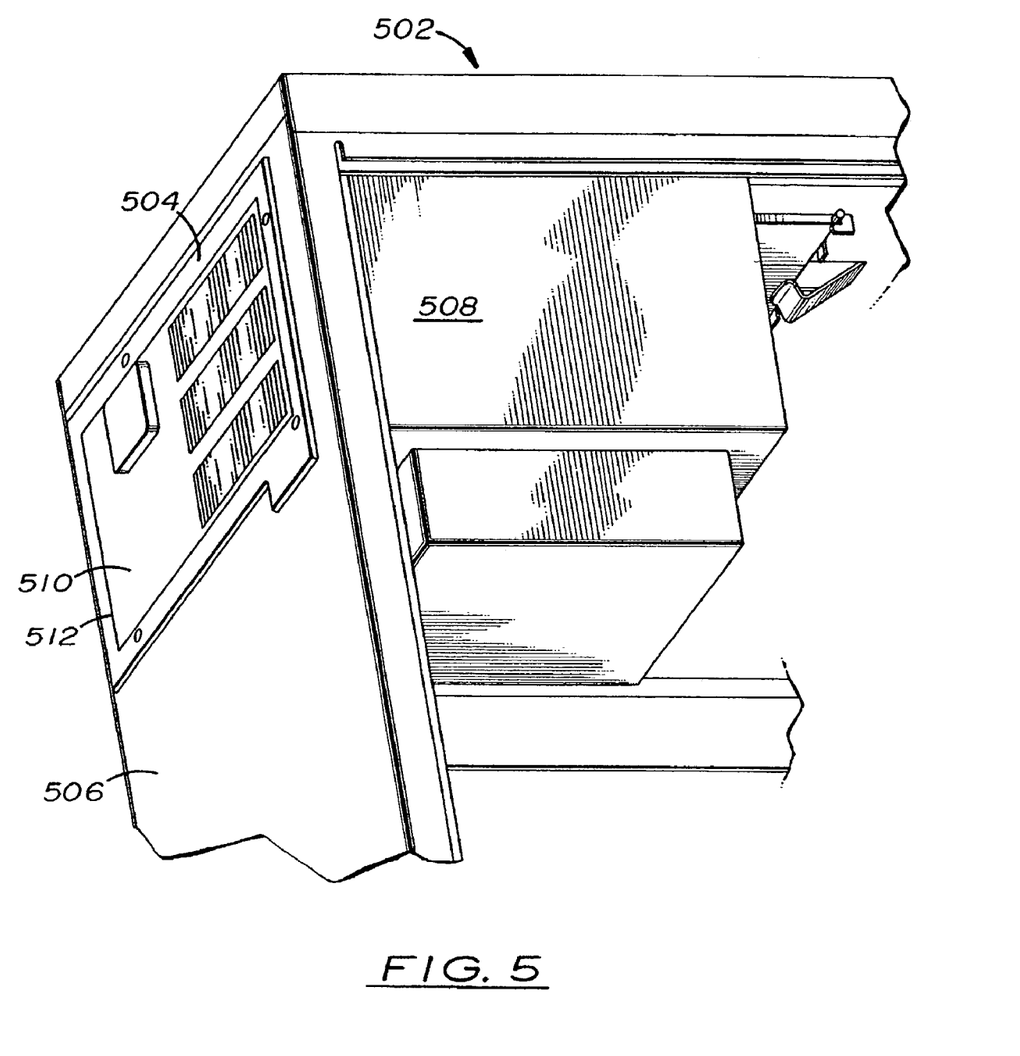
FIG. 5 is an isometric drawing of an exemplary embodiment wherein a device is mounted in a chassis, the chassis including a recess suitable for accepting a device.

Referring now to FIG. 5, an exemplary embodiment 500 of the present invention is shown where a device is mounted in a chassis, the chassis including a recess suitable for accepting a device. The chassis 502 may include a recess 504 formed in a second side 506 of the chassis 502. Preferably, the recess 504 corresponds to a device 508 so as to secure a second side 510 of the device to the chassis 502. The recess 504 may also include an aperture 510 to provide ventilation for the device 508, such as a power supply, and/or access to the device 508, such as a floppy drive, removable media device, and the like as contemplated by a person of ordinary skill in the art. Further, it may be desirable to form the recess 504 and/or aperture 510 as the second side 506 of the chassis 502 is "stamped-out".

Figure 6:
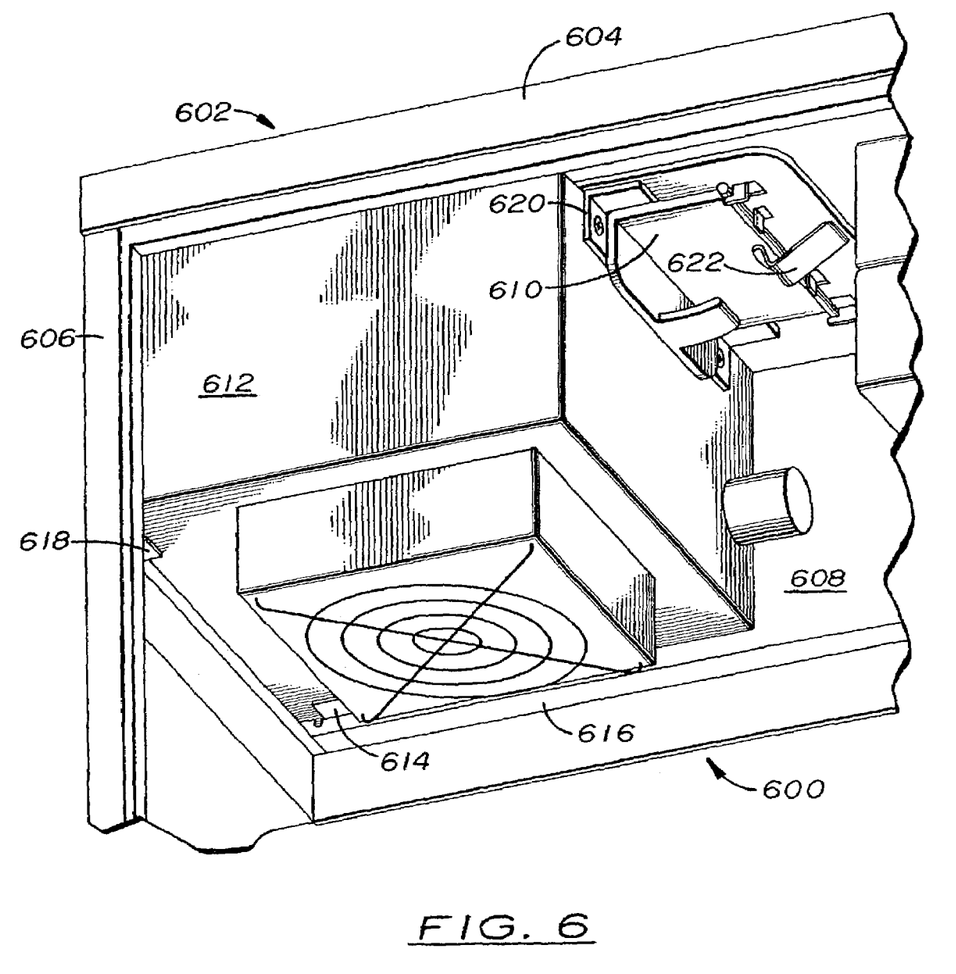
FIG. 6 is an isometric drawing of an exemplary embodiment wherein a device retention apparatus includes a tab mounted to a chassis, the tab suitable for securing a device.

Referring now to FIG. 6, an exemplary embodiment 600 of the present invention is shown wherein a device retention apparatus includes a tab mounted to a chassis, the tab suitable for securing a device. A chassis 602 may include a first side 604, a second side 606 and a third side 608. The first side 604 is oriented generally perpendicular to the second side 606, and the third side 608 is oriented generally perpendicular to the first side 604 and the second side 606. A retention mechanism 610 is mounted to the first side 604 for securing a device 612 to the chassis 602. A tab 614 is mounted to the third side 608, the tab 614 suitable for securing the device 612. Preferable, the tab 614 is placed at a distance from the first side 604 corresponding to a dimension of a device 612 to be mounted. Thus, the device 612 is further secured to the chassis 612. Additionally, the tab 614 may be extended to form a rail 616 to further support the device 612. It should be apparent that a tab 614 of the present invention may be formed in a variety of shapes without departing from the spirit and scope of the present invention, as well as be mounted at a variety of locations, such as including a tab 618 on the first side 604 of the chassis 602. Further, utilizing a tab may diminish the need of utilizing a force supplied by the retention member 610 to secure the device to the housing. For example, the tab 614 and/or retainer 620 may be used to support the device 612 to the chassis 602. Thus, the retention member 610 does not need to utilize a force against the device 612 to keep the device 612 secured to the chassis 602.

To install a device 612 in the chassis 602, the device is inserted into the chassis so as to engage the tab 614. The device 612 is then slid against the tab 614 toward the second side 606 of the chassis 602. A retention member 610, pivotally mounted to the first side 604 of the chassis 602, is rotated until the retention mechanism 610 engages the retainer 618, thereby securing the device 612 to the chassis 602. It may be preferable to include a biasing mechanism 622 with the retention mechanism 610 to bias the retention mechanism 610 in a secured position. Thus, the device may be installed in a vastly improved manner over previous installation methods that required the use of screws and tools.

Figure 7:
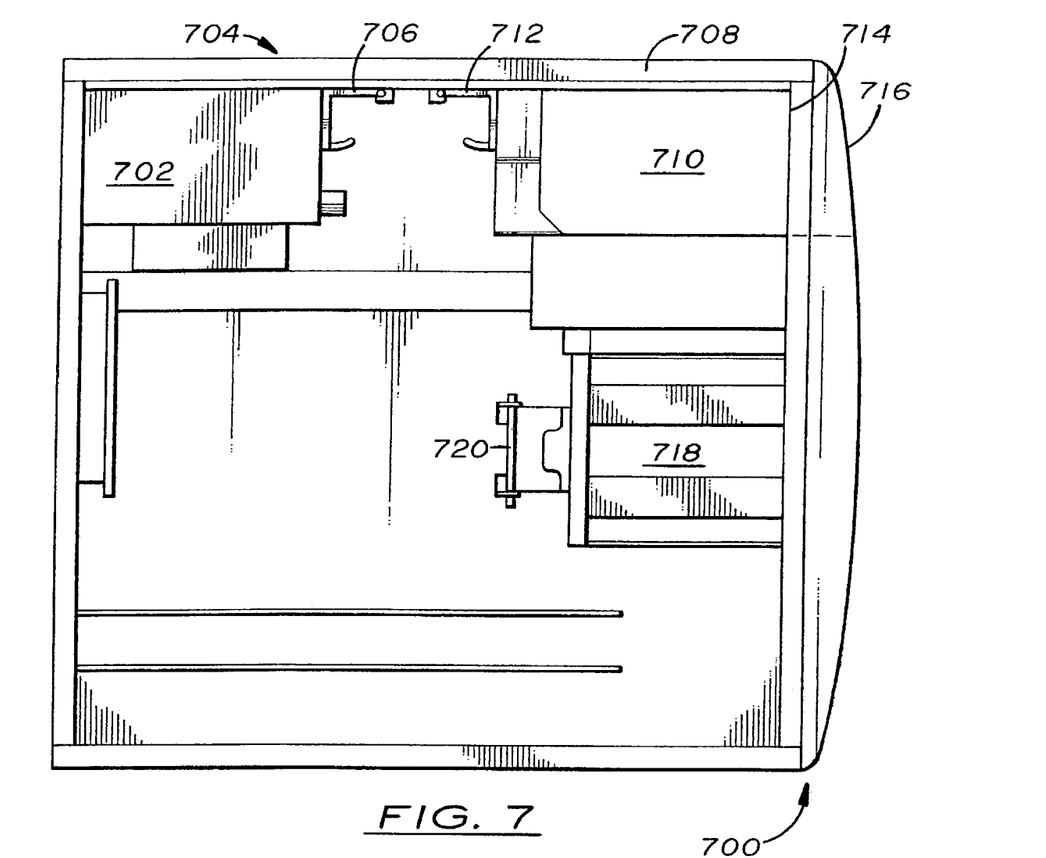
FIG. 7 is an illustration of an exemplary embodiment of the present invention wherein pluralities of device retention apparatus are utilized to secure a variety of devices in a chassis.

Referring now to FIG. 7, an exemplary embodiment 700 of the present invention is shown wherein multiple device retention apparatus are utilized to secure a variety of devices in a chassis. A first device 702, in this instance a power supply, is secured to the rear portion of the chassis 704 utilizing a retention member 706 mounted to the top portion 708 of the computer chassis 702. A second device 710, such as a compact disc read-only memory (CD-ROM), digital versatile disc (DVD), floppy drive, and the like is mounted utilizing a retention member 712 to the front 714 of the chassis 704. An aperture 716 may be provided to access the devices 710 when secured to the chassis 704. Therefore, the devices may be accessed in a traditional manner yet still utilize the improved mounting and removal capabilities of the present invention. Further, a third device, such as a hard disk drive, RAID array 718, and the like, may be mounted internally in the chassis 704 utilizing a retention member 720. In this instance, the devices are secured to the front 714 of the chassis, yet are accessible from the side of the chassis 704. It should be apparent that a variety of orientations and positions of a device mounting apparatus of the present invention may be utilized without departing from the spirit and scope thereof, the previous examples are merely exemplary embodiments thereof.

Figure 8:
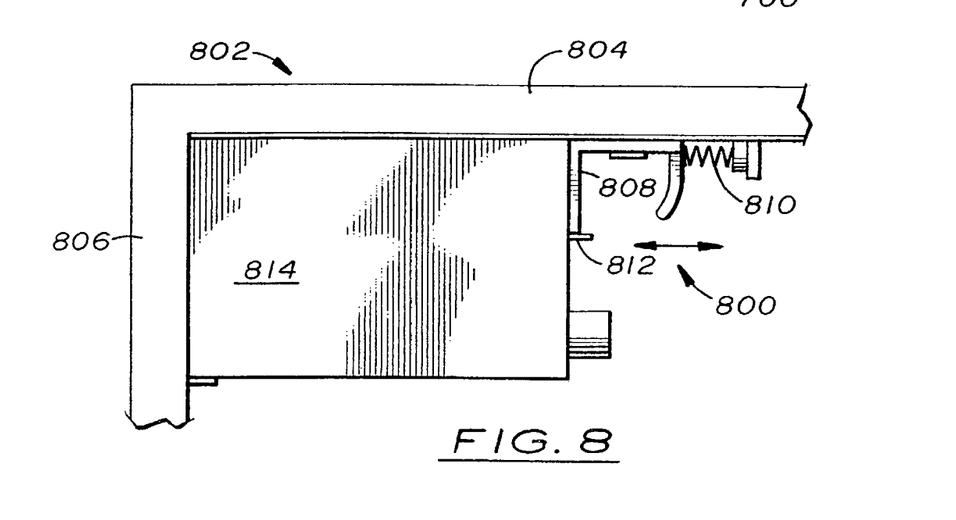
FIG. 8 is an illustration of an exemplary embodiment of the present invention wherein a retention member is slideably mounted to a chassis, the retention member suitable for securing a device to the chassis.

Referring now to FIG. 8, an exemplary embodiment 800 of the present invention is shown wherein a retention member is slideably mounted to a chassis, the retention member suitable for securing a device to the chassis. The chassis 802 includes a first portion 804 and a second portion 806. A retention member 808 is slideably mounted to the first portion 804 of the chassis 802. A biasing mechanism 810 is included for biasing the retention member 808 to the secured position. Thus, the retention mechanism 808 may be grasped, preferably with the use of a grasping portion 812, to increase the distance between the retention member 808 and the second portion 806 of the chassis, thereby permitting insertion and/or removal of a device 814 from the chassis 802. Additionally, by slideably mounting the retention member 808, devices with a variety of dimensions may be secured. For example, the retention member may be able to secure a hard drive or a compact disc read-only memory (CD-ROM) without having to readjust the retention member, even though the length of the two devices is different.

Figure 9:
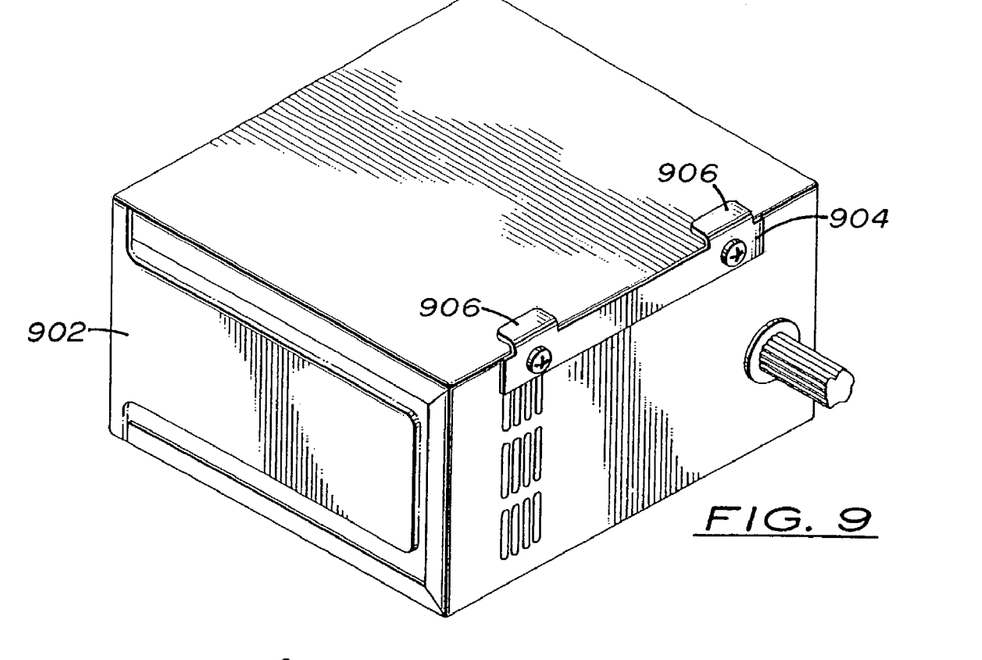
FIGS. 9, 10 and 11 are illustrations of an exemplary embodiment wherein a device is mounted to a chassis utilizing a receptacle suitable for receiving an engaging member disposed on the power supply.
Figure 10:
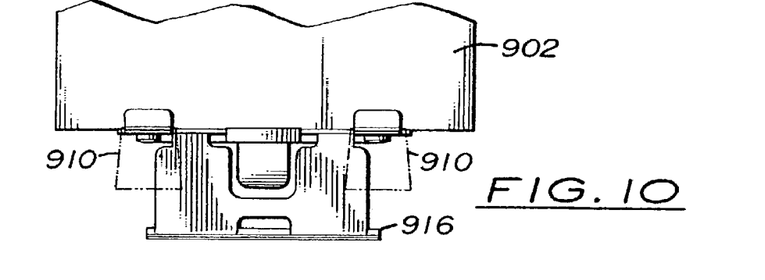
Figure 11:
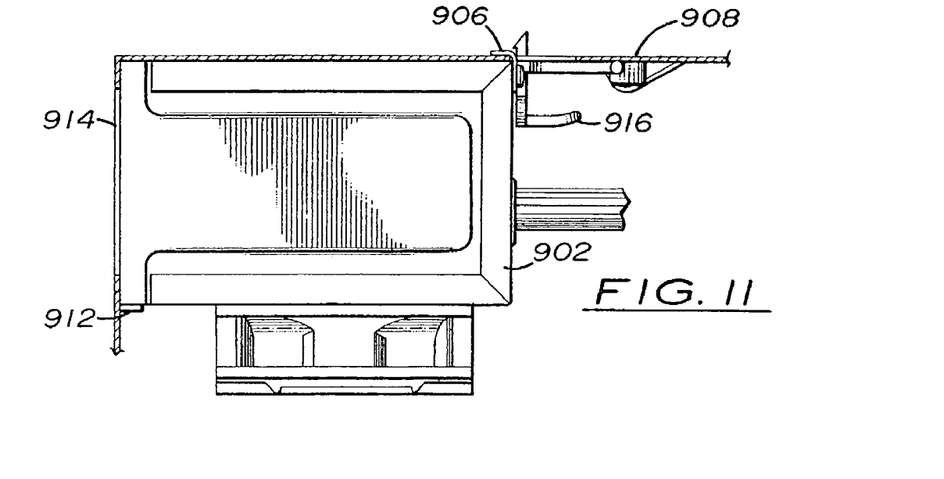

Referring now to FIGS. 9, 10 and 11, an exemplary embodiment of the present invention is shown wherein a device is mounted to a chassis utilizing a receptacle suitable for receiving a retainer including an engaging member, the retainer disposed on the device. A device, in this instance a power supply 902, may include a retainer 904 formed with engaging members 906 to further secure the power supply 902 in a chassis 908. The engaging members 906 are formed to correspond with receptacles 910 disposed on the chassis 908. In this instance, the engaging members 906 are formed so as to extend over the power supply 902.

Therefore, to install the power supply 902 in the chassis 908, the engaging members 906 are inserted into the receptacles disposed on the chassis 908. The power supply 902 is then slid toward a second side 914 of the chassis 908 thereby securing the rear portion of the power supply 902 with a tab 912 disposed on the chassis 908, and further securing the engaging members 906 of the retainer 904 to the receptacles 910. Then, the retention member 916 is rotated to a securing position, thereby preventing the engaging members 906 from separating from the receptacles 910 and also keeping the power supply 902 secured with the use of the tab 912. In this way, a heavy device, such as a power supply, may be installed in an improved manner in a chassis without the use of tools, thereby saving both time and money. Although the engaging member is shown disposed on the power supply and the receptacle is shown disposed in the chassis, it should be apparent that the engaging member may be mounted to the chassis and the receptacle mounted to the power supply without departing from the spirit and scope of the present invention.

Figure 12A:
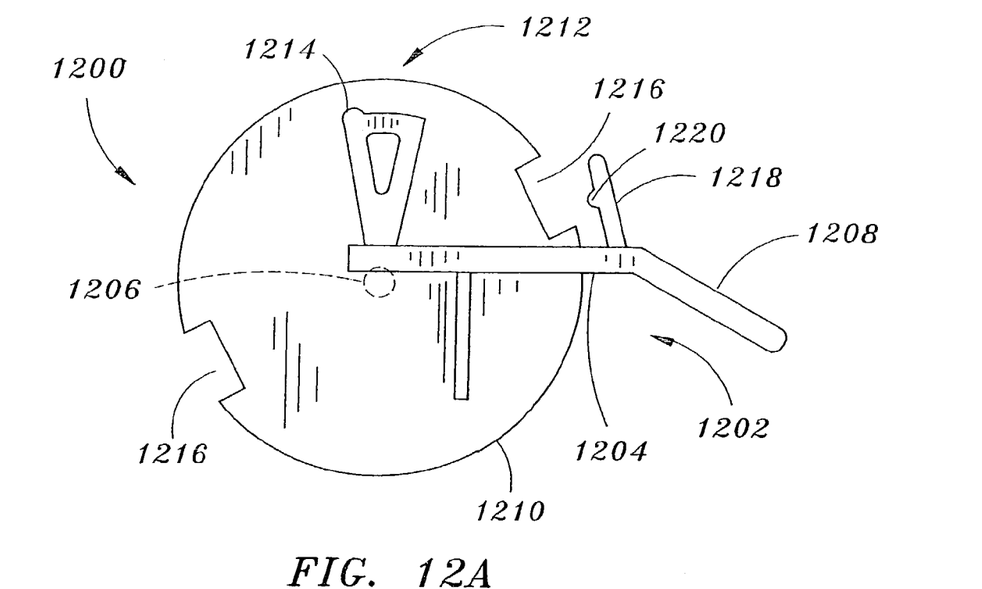
FIGS. 12A, 12B, 13 and 14 are illustrations of an exemplary embodiment of the present invention wherein a retention mechanism configured as a cam assembly is shown.

Referring generally now to FIGS. 12A through 14, a retention member of the present invention may be configured in a variety of ways without departing from the spirit and scope of the present invention. For example, as shown in FIG. 12A, a retention member 1200 may be configured for rotational movement in spaces in which space is a concern. The retention member 1200 includes a lever assembly 1202 for manipulation of the retention member 1200 by a user. The lever assembly 1202 may include a first portion 1204 positioned generally parallel or coexistent to a radial extending through a rotation point 1206 of the retention member.

A second portion 1208 of the lever assembly 1202 may be angled relative to the first portion 1204 to provide ease of rotation of the lever assembly. For instance, the second portion 1208 of the lever assembly 1202 may be angled to enable a user to rotation the retention member 1200 over a desired range based on the confines of a chassis. Preferably, the second portion 1208 and first portion 1204 of the lever assembly are configured for manipulation by one finger of a user and is angled upward and/or with a sufficient clearance for securing tabs, as will be described subsequently in the description.

The retention member 1200 includes a base portion 1210 configured to provide a stable surface for utilization of the retention member 1200 against a surface of a chassis. A contact portion 1212 is disposed on the base portion 1210 for contacting a device for installation. The contact portion 1212 includes a locking protrusion 1214 for securing the retention member 1200 against a device. For instance, the locking protrusion 1214 may be configured of a sufficient height so as to enable rotation of the retention member 1200 and contact of the contact portion 1212 against the device yet provide a sufficient resistance to rotation of the retention member from a secured position, as will be described subsequently.

Channels 1216 may also be included for installation of the retention member 1200 in a chassis by enabling securing tabs of the chassis to pass through the channels 1216. Additionally, a latching member 1218, which may also include a locking protrusion 1220, may be disposed on the lever assembly 1202 to secure the retention member 1200 to a tab. The installation and securing of the retention assembly 1200 in a chassis is will be described subsequently in the discussion.

Figure 12B:
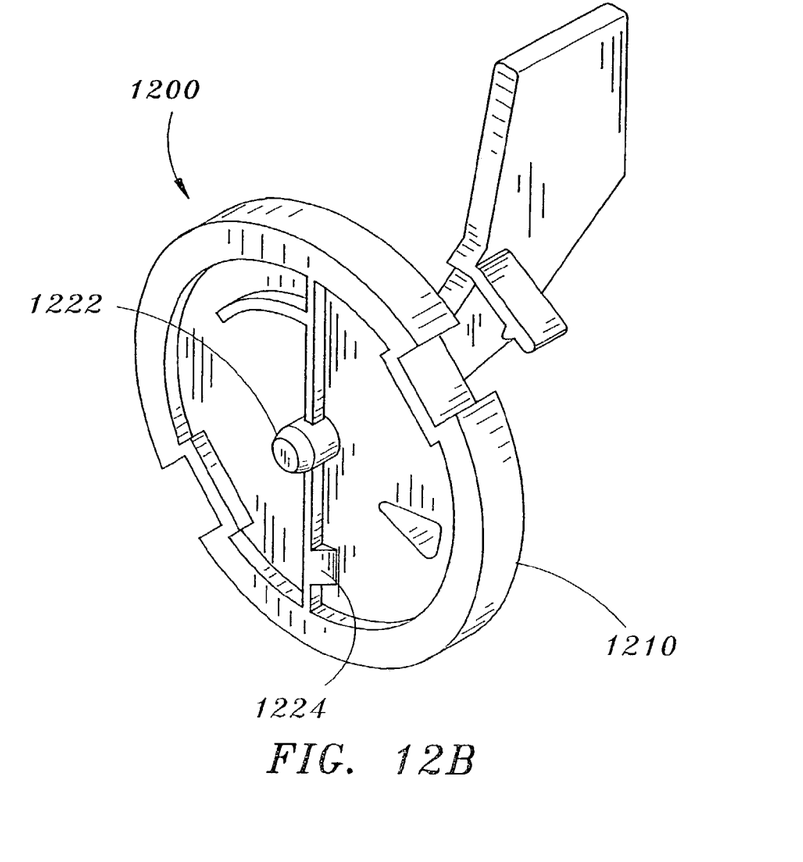

Referring now to FIG. 12B, an underside view of the retention member 1200 as shown in FIG. 12A is illustrated. To provide rotational motion of the retention member 1200 of the present embodiment, a post 1222 may be included for insertion into a hole in a chassis. In one embodiment of the present invention, the post 1222 provides substantial lateral support of the retention member 1200 in the chassis to provide a tight fit. In other contemplated embodiments, a post 1222 is not included, but instead securing of the retention member is performed through the use of tabs. The retention member 1200 may also include an incline portion 1224 positioned on the "underside," i.e. positioned between the base 1210 and the chassis, of the retention member 1200. The incline portion 1224 may be utilized to engage a tab disposed on the chassis to lock the retention member 1200 in place.

Figure 13:
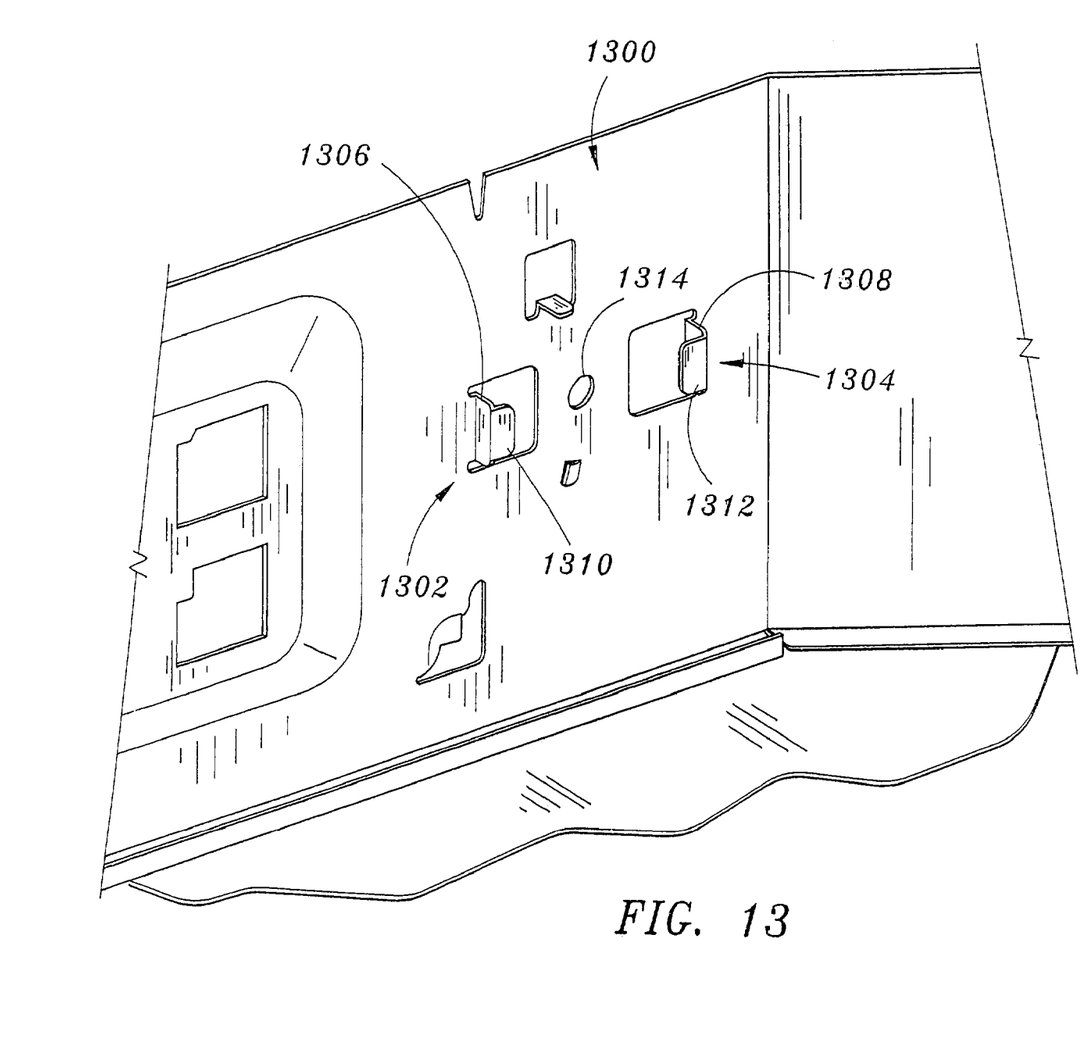

For example, referring now to FIG. 13, an exemplary embodiment of the present invention is shown wherein a chassis configured to utilize a rotational retention member is shown. Securing tabs 1302 & 1304 are disposed on the chassis 1300 to secure the retention member 1200 to the chassis, yet enable rotational movement of the retention member 1200. For instance, the securing tabs 1302 & 1304 may be positioned on generally opposite sides of a retention member. The securing tabs 1302 & 1304 may include a first tab portion 1306 & 1308 which is preferably sized to generally correspond to the thickness of the base 1210 of the retention member 1200. The securing tabs 1302 & 1304 may also include a second tab portion 1310 & 1312 to secure the retention member 1200 against the surface of the chassis 1300. Preferably, the second tab portions 1310 & 1312 are sized to pass through the channels 1216 (FIG. 12A) of the retention member 1200.

Thus, the retention member of the present invention may be installed and operated in an efficient and easy manner by a user. For instance, referring now to FIG. 14, an exemplary embodiment of the present invention is shown wherein a retention member is installed in a chassis. To install a retention member 1200 in a chassis 1300, the retention member 1200 is positioned so that the second tab portions 1310 & 1312 of the securing tabs 1302 & 1304 pass through the channels 1216 of the retention member 1200. By doing this, the post 1222 is positioned for insertion into a corresponding receptacle 1314 shaped to receive a post 1222 of a retention member 1200, preferably with a sufficient tolerance to limit lateral movement of the retention member 1200 along the surface of the chassis 1300.

Figure 14:
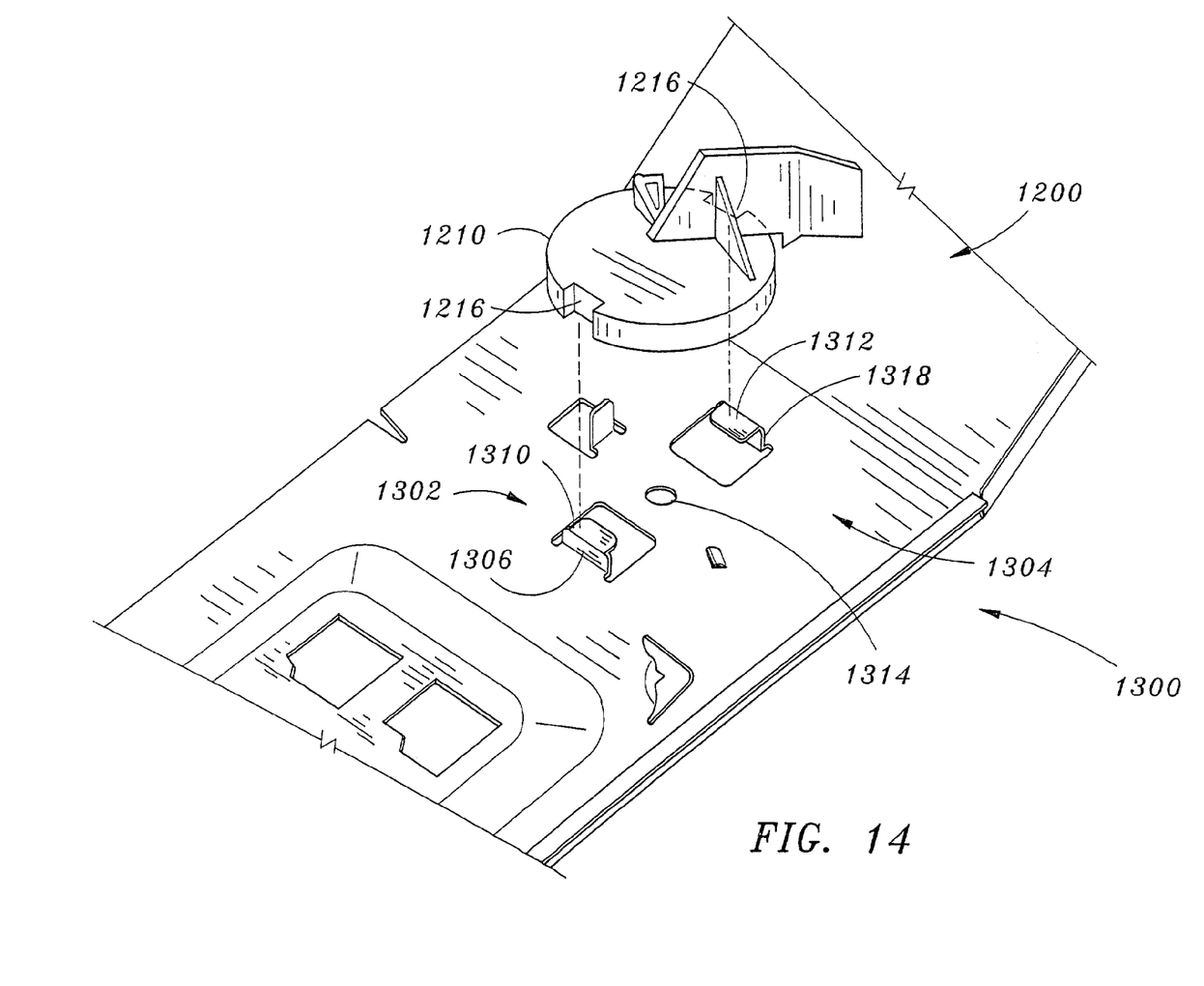

When the retention member 1200 is disposed against the surface of the chassis 1300, the retention member 1200 may be rotated so that at least a portion of the base 1210 of the retention member 1200 is disposed beneath the second tab portions 1310 & 1312 of the securing tabs 1302 & 1304. In this way, the retention member 1200 is restricted from movement away from the surface of the chassis 1300, yet is capable of rotational movement to secure a device to the chassis 1300.

Referring now to FIGS. 15 through 18, an exemplary embodiment of the present invention is shown wherein steps for installing a power supply in an information handling system chassis are shown. The manufacture of information handling systems is competitive to the point that even small efficiencies realized in the assembly of the information handling system may have a profound effect. Further, because information handling systems are may be subject to mishandling during shipping, the apparatus and method utilized to secure the device must be robust and durable. To address these concerns, the present invention provides a durable apparatus for mounting a device which may be utilized in a chassis having a small form factor in an efficient manner by an assembler of the system. Further, the present invention may be utilized to secure devices having a high weight, such as power supplies and the like.

Figure 15:
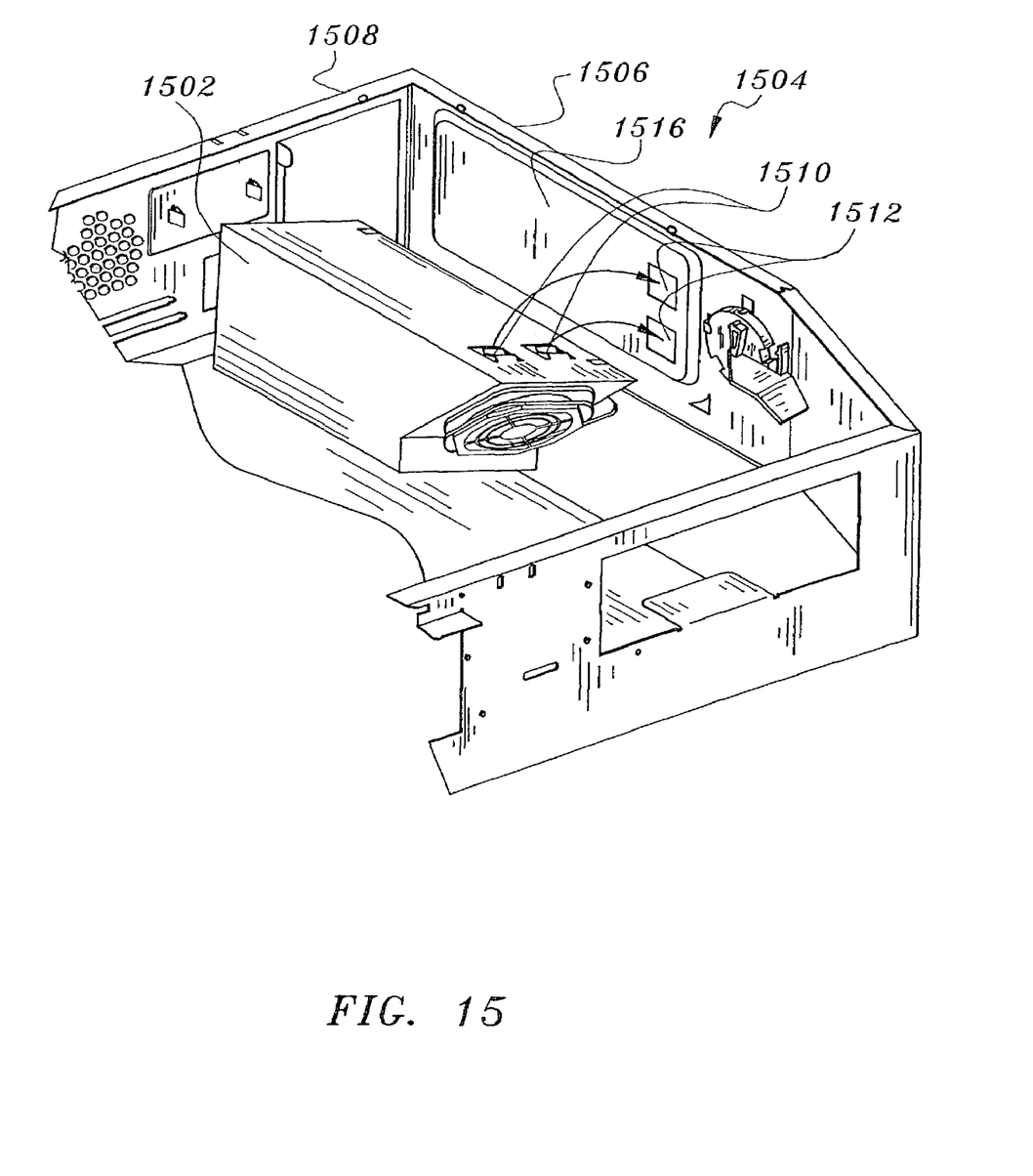
FIGS. 15, 16, 17 and 18 are illustrations of an exemplary embodiment of the present invention wherein mounting of a power supply with a retention mechanism configured as a cam assembly is shown.
Figure 16:
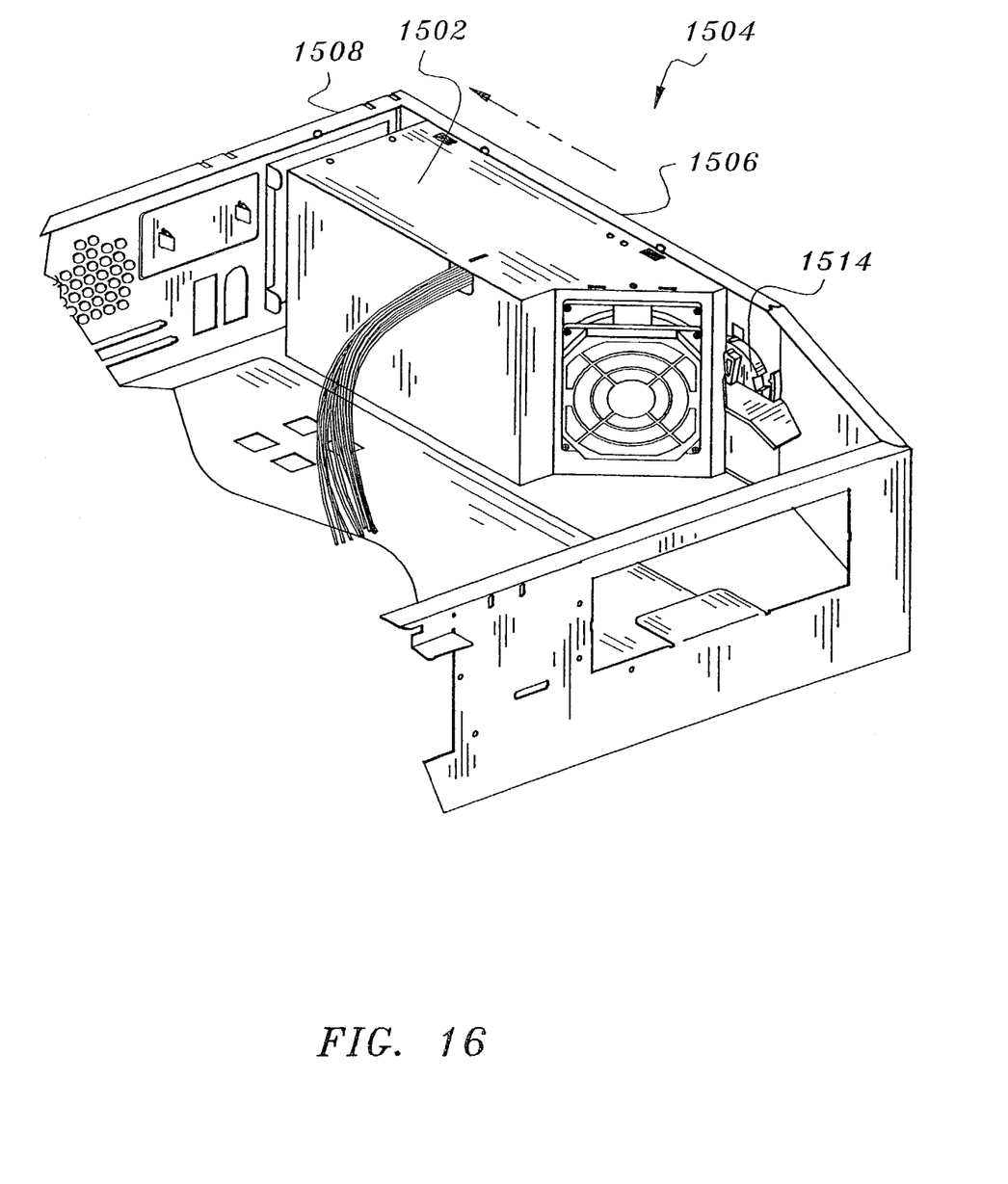

Referring now to FIG. 15, an exemplary electronic device and chassis of the present invention are shown. An electronic device, in this instance a power supply 1502, is provided for mounting in an information handling system chassis 1504. The information handling system chassis includes a first side 1506 and a second side 1508 which are oriented generally perpendicular to each other. A retainer is included on the power supply 1502, in this instance formed to include engaging members 1510 configured to be received within receptacles 1512 of the first side 1506 of the chassis 1504.

To secure the power supply 1502 to the chassis 1504, the power supply is first positioned so that the engaging members 1510 are disposed within the receptacles 1512 of the first side 1506 of the chassis. The power supply is then slid toward the second side, such as by grasping by a user, rotation of the retention member 1514 configured as a cam assembly, and the like as contemplated by a person of ordinary skill in the art. For instance, the retention member 1514 may be rotated to contact the power supply 1502 to force the supply rearward in the chassis 1504.

Figure 17:
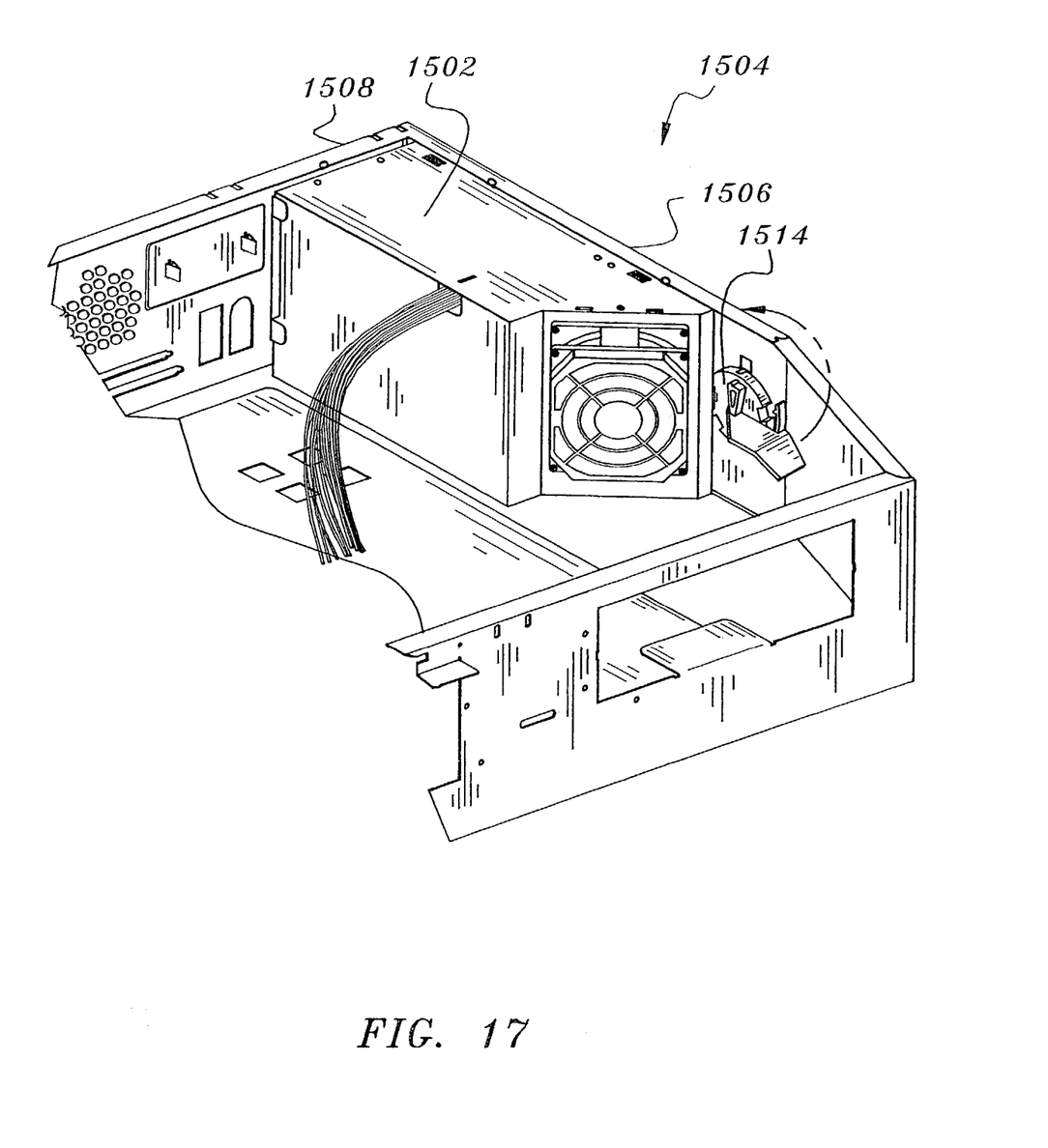
Figure 18:
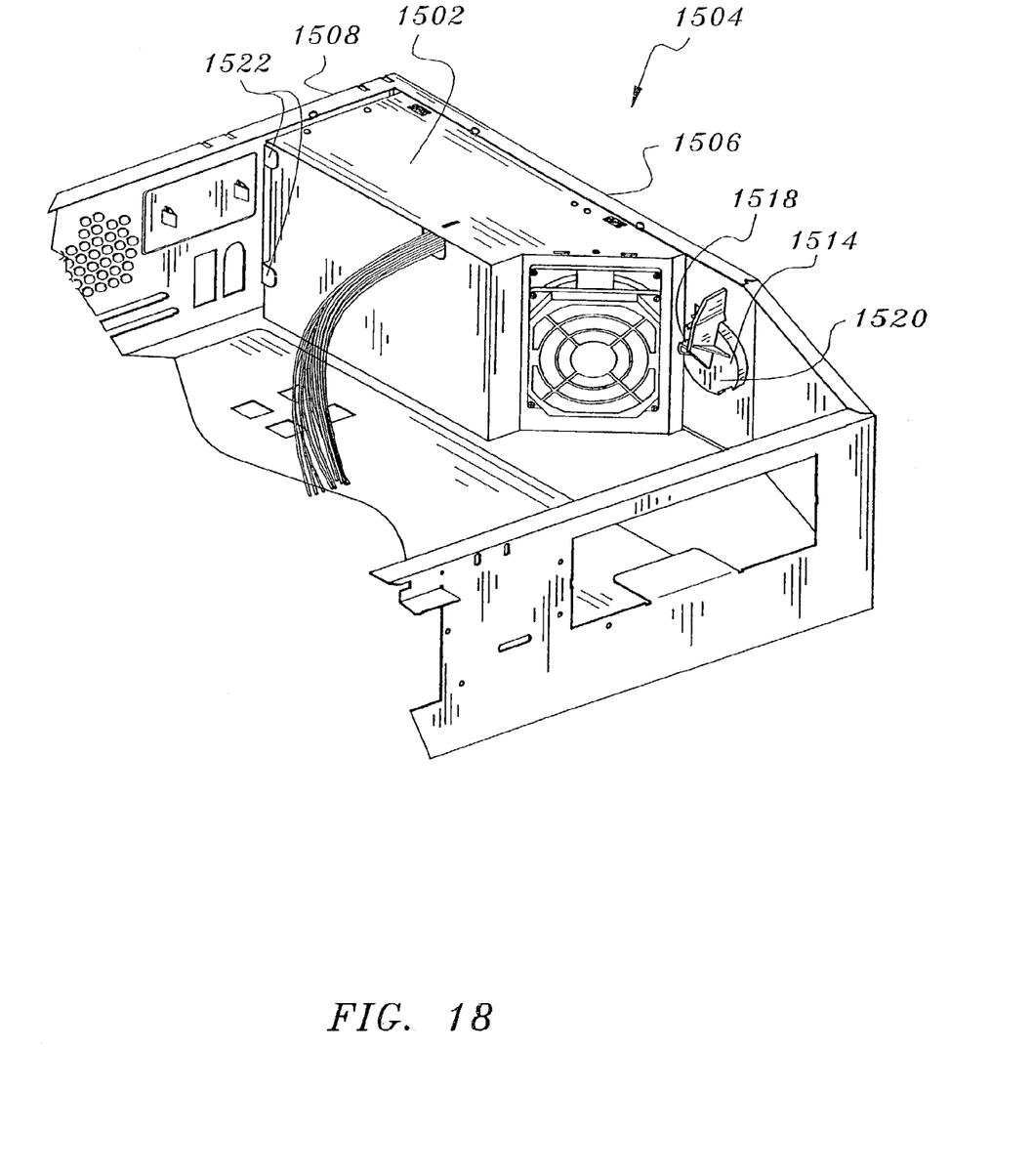

Additionally, as shown in FIG. 17, the power supply may be positioned manually by a user and then the retention member 1514 rotated to secure the power supply 1502 to the chassis 1504. Because the power supply 1502 may be mounted on a raised portion 1516 (FIG. 15) of the first side 1506 of the chassis 1504, the retention member 1514 may include a raised contact portion 1518 for contacting the power supply 1502. For instance, the retention member 1514 may include a support portion 1520 that may be positioned between the power supply 1502 and the chassis 1504. The retention member 1514 is rotated generally parallel to the first side 1506 of the chassis 1504 so that the contact portion 1518 of the retention member 1514 may engage the power supply 1502. Tabs 1522 may also be included on the second side 1508 of the chassis to further secure the power supply 1502 to the housing 1504.

For example, a retention member 1202 of the present invention may be configured as a cam assembly for use in chassis where space is a consideration. The retention member 1202 may be rotatably mounted to a side 1204 of a chassis. Preferably, the retention member 1202 is formed to enable insertion of an electronic device, such as a power supply 1206, in a chassis as shown in FIG. 13. The retention member 1202 is then rotated in a manner which is parallel to the chassis 1202, as shown in FIG. 13, to contact the power supply 1206. The retention member 1202 may then be place in a securing position as shown in FIG. 14 to secure the power supply 1206 to the chassis. Thus, a retention member 1202 of the present invention may also be configured as a cam assembly for use in a chassis having limited space yet still providing a clamping force as previously described in relation to FIGS. 1 through 11.

It is believed that the apparatus for removal and assembly of a device within a chassis of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A device retention mechanism suitable for mounting a device, comprising:
   a chassis for receiving a device, the chassis having a first side and a second side, the first side being generally perpendicular to the second side;
   a retention member mounted on the first side of the chassis in a manner enabling rotation about an axis oriented substantially perpendicular to a plane of the first side;
   wherein the retention member is configured as a cam assembly such that rotation of the retention member exerts a force against the device to push the device toward the second side of the chassis for securing the device to the chassis;
   wherein the chassis has a third side oriented substantially parallel to the second side and substantially perpendicular to the first side and defining an interior of the chassis between the second and third sides, the retention member being positioned in the interior between the second side and the third side;
   wherein the retention member comprises a rotatable base portion, a lever mounted on the base portion and extending outwardly from the base portion, and a locking protrusion mounted on the base portion and configured to exert force against the device when the base portion is rotated;
   wherein the chassis includes at least one securing tab for securing the base portion to the chassis, the at least one securing tab extending from the first side of the chassis and extending over a portion of the base portion to hold the base portion against the first side of the chassis.

2. The device retention mechanism as described in claim 1, wherein the retention member is capable of assuming a first position and a second position, and wherein the first position is suitable for securing the device in the chassis and the second position is suitable for releasing the device from the chassis.

3. The device retention mechanism as described in claim 2, wherein the retention member includes a biasing mechanism suitable for biasing the retention member toward the first position.

4. The device retention mechanism as described in claim 1, wherein the retention member is capable of rotational motion generally parallel to the first side of the chassis.

5. The device retention mechanism as described in claim 1, wherein the retention member exerts a clamping force to the device between the retention member and the second side of the chassis.

6. The device retention mechanism as described in claim 1, further comprising a retainer disposed on the device, the retainer including an engaging member suitable for engaging a receptacle disposed on the chassis.

7. The device retention mechanism as described in claim 6, wherein the receptacle is disposed on the second side of the chassis.

8. The device retention mechanism as described in claim 1 wherein the base portion is substantially disc-shaped.

9. The device retention mechanism as described in claim 1 wherein the base portion is movable between the at least one securing tab and the first side of the chassis.

10. The device retention mechanism as described in claim 1, wherein the base portion includes a channel through which the at least one securing tab is movable when the base portion is mounted on the chassis.

11. The device retention mechanism as described in claim 1, wherein the at least one securing tab includes a pair of securing tabs, the securing tabs being located at substantially opposite sides of the base portion, the base portion including a pair of the channels through which the pair of securing tabs are movable when the base portion is mounted on the chassis.

12. The device retention mechanism as described in claim 1, wherein the base portion additionally comprises a latching member configured to latch the at least one securing tab when the base portion is rotated into a position in which the locking protrusion has exerted force against the device.

13. A device retention mechanism comprising:
   an electronic device;
   a chassis suitable for receiving the device, the chassis having a first side and a second side, the first side positioned generally perpendicular to the second side;
   a retention member mounted to the first side of the chassis, the retention member mounted in such a manner as to enable rotational movement about an axis oriented generally perpendicular to the first side of the chassis;
   wherein the retention member is mounted to the chassis to enable the retention member to contact the device and progressively push the device toward the second side of the chassis as the retention member is rotated, thereby securing the device to the chassis;
   wherein the chassis has a third side oriented substantially parallel to the second side and substantially perpendicular to the first side and defining an interior of the chassis between the second and third sides, the retention member being positioned in the interior between the second side and the third side;

wherein the retention member comprises a rotatable base portion and a locking protrusion mounted on the base portion and configured to exert force against the device when the base portion is rotated; and wherein the chassis includes at least one securing tab for securing the base portion to the chassis, the at least one securing tab extending from the first side of the chassis and extending over a portion of the base portion to hold the base portion against the first side of the chassis.

14. The device retention mechanism as described in claim 13, wherein the retention member is configured as a cam assembly.

15. The device retention mechanism as described in claim 13, wherein the retention member is capable of assuming a first position and a second position, and wherein the first position is suitable for securing the device in the chassis and second position is suitable for releasing the device from the chassis.

16. The device retention mechanism as described in claim 15, wherein the retention member includes a biasing mechanism suitable for biasing the retention member toward the first position.

17. The device retention mechanism as described in claim 13, wherein the retention member exerts a clamping force to the device between the retention member and the second side of the chassis.

18. The device retention mechanism as described in claim 13, wherein the second side of the chassis includes a recess suitable for receiving a portion of the device as the device is progressively pushed toward the second side of the chassis.

19. The device retention mechanism as described in claim 13, further comprising a retainer disposed on the device, the retainer including an engaging member suitable for engaging a receptacle disposed on the chassis.

20. The device retention mechanism as described in claim 19, wherein the receptacle is disposed on the second side of the chassis.

21. A device retention mechanism comprising:

an electronic device including a retainer having at least one engaging member;

a chassis suitable for receiving the electronic device, the chassis having a first side and a second side, the first side positioned generally perpendicular to the second side, the second side including a receptacle sized to receive the at least one engaging member of the electronic device;

a retention member mounted on the first side of the chassis in a manner enabling rotation about an axis oriented substantially perpendicular to a plane of the first side;

wherein the retention member is configured as a cam assembly such that rotation of the retention member exerts a force against the device to push the device toward the second side of the chassis for securing the device to the chassis;

wherein the chassis has a third side oriented substantially parallel to the second side and substantially perpendicular to the first side and defining an interior of the chassis between the second and third sides, the retention member being positioned in the interior between the second side and the third side;

wherein the retention member comprises a rotatable base portion and a locking protrusion mounted on the base portion and configured to exert force against the device when the base portion is rotated; and wherein the chassis includes at least one securing tab for securing the base portion to the chassis, the at least one securing tab extending from the first side of the chassis and extending over a portion of the base portion to hold the base portion against the first side of the chassis.

22. The device retention mechanism as described in claim 21, wherein the retention member exerts a clamping force to the device between the retention member and the second side of the chassis.

23. The device retention mechanism as described in claim 21, wherein the second side of the chassis includes a recess suitable for receiving at least a portion of the device.

24. The device retention mechanism as described in claim 21, wherein the retention member is capable of assuming a first position and a second position, and wherein the first position is suitable for securing the device in the chassis and the second position is suitable for releasing the device from the chassis.

* * * * *